United States Patent
Durkee et al.

(10) Patent No.: US 11,211,661 B2
(45) Date of Patent: Dec. 28, 2021

(54) RECHARGEABLE BATTERY AND RECHARGEABLE BATTERY HOLSTER FOR LIGHT ELECTRIC VEHICLES

(71) Applicant: NEUTRON HOLDINGS, INC., San Francisco, CA (US)

(72) Inventors: Paul Durkee, San Francisco, CA (US); Andrew Titus, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 75 days.

(21) Appl. No.: 16/728,957

(22) Filed: Dec. 27, 2019

(65) Prior Publication Data
US 2020/0212395 A1    Jul. 2, 2020

Related U.S. Application Data

(60) Provisional application No. 62/785,598, filed on Dec. 27, 2018.

(51) Int. Cl.
*H02J 7/00* (2006.01)
*H01M 50/20* (2021.01)
*H02J 7/14* (2006.01)

(52) U.S. Cl.
CPC .......... *H01M 50/20* (2021.01); *H02J 7/1446* (2013.01)

(58) Field of Classification Search
None
See application file for complete search history.

(56) References Cited

U.S. PATENT DOCUMENTS

| | | | | |
|---|---|---|---|---|
| 4,092,580 | A * | 5/1978 | Prinsze | F21L 4/085 320/115 |
| 8,165,643 | B2 * | 4/2012 | Lin | H02J 7/0044 455/573 |
| 9,130,359 | B2 * | 9/2015 | Kushalappa | B60L 3/0007 |
| 2009/0280871 | A1 * | 11/2009 | Hofer | H02J 7/0044 455/573 |
| 2011/0169451 | A1 * | 7/2011 | Stampfli | H04R 1/1033 320/115 |
| 2012/0145852 | A1 | 6/2012 | Chiang | |
| 2013/0207460 | A1 | 8/2013 | Kawatani et al. | |

FOREIGN PATENT DOCUMENTS

EP        3266693 A1    1/2018

OTHER PUBLICATIONS

PCT International Search Report and Written Opinion in International Application PCT/US2019/068825, dated Mar. 27, 2020, 16 pages.

* cited by examiner

*Primary Examiner* — Arun C Williams
(74) *Attorney, Agent, or Firm* — Dentons US LLP

(57) ABSTRACT

This disclosure describes a rechargeable battery for a light electric vehicle. More specifically, this disclosure describes a rechargeable battery and a rechargeable battery holster that may be used to removably couple the rechargeable battery to a light electric vehicle.

20 Claims, 8 Drawing Sheets

RECHARGEABLE BATTERY AND RECHARGEABLE BATTERY HOLSTER FOR LIGHT ELECTRIC VEHICLES

CROSS-REFERENCE TO RELATED APPLICATIONS

This application claims priority to U.S. Provisional Application No. 62/785,598 filed on Dec. 27, 2018 and titled "Rechargeable Battery and Battery Holster for Electric Vehicles" the entire discloser of which is hereby incorporated by reference in its entirety.

BACKGROUND

Electric vehicles (e.g., scooters, bicycles, etc.) are typically powered by a power source such as, for example, a rechargeable battery. As the electric vehicle is used, power in the rechargeable battery is consumed. When this occurs, a user of the electric vehicle may exchange the rechargeable battery with little or no remaining power with another rechargeable battery that has more power or is fully charged

SUMMARY

Light electric vehicles (e.g., scooters, bicycles, etc.) are typically powered by a power source such as, for example, a rechargeable battery. In some cases, the rechargeable battery may be removably coupled to a light electric vehicle. For example, the light electric vehicle may include a rechargeable battery holster that secures the rechargeable battery to the light electric vehicle. The rechargeable battery holster allows an individual to remove the rechargeable battery from the light electric vehicle. As such, the individual may exchange a rechargeable battery with little or no remaining power with another rechargeable battery (e.g., a rechargeable battery that has more power or is fully charged).

The rechargeable battery holster may include a pivot mechanism or structure that mates with a corresponding channel/structure defined by, formed in, or included with a rechargeable battery. The pivot mechanism is shaped such that it may be releasably coupled to the rechargeable battery when the rechargeable battery is in a first orientation. As the rechargeable battery moves from the first orientation to a second orientation, the pivot mechanism secures the rechargeable battery to the rechargeable battery holster.

The rechargeable battery includes a recess or channel defined by, formed in, or otherwise coupled to a housing of the rechargeable battery. The channel is shaped such that it receives the pivot mechanism of the rechargeable battery holster when the rechargeable battery is in a first orientation or position. The rechargeable battery may move or pivot around the pivot mechanism of the rechargeable battery holster as the rechargeable battery moves from the first orientation to a second orientation. When the rechargeable battery moves from the first orientation to the second orientation, the channel engages the pivot mechanism and prevents the rechargeable battery from being removed from the rechargeable battery holster.

The present disclosure also describes a rechargeable battery for a light electric vehicle. The rechargeable battery includes a housing having a first side and a second side. The first side of the housing defines a first channel that extends substantially along a length of the first side of the housing. The first channel receives a pivot mechanism of a rechargeable battery holster when the rechargeable battery is positioned in a first orientation. The first channel engages the pivot mechanism as the rechargeable battery pivots around the pivot mechanism. For example, as the rechargeable battery is moved from the first orientation to a second orientation, an inner sidewall of the channel engages with one or more outer sidewalls of the pivot mechanism. The second side of the housing defines a second channel. The second channel engages a locking mechanism of the rechargeable battery holster when the rechargeable battery reaches the second orientation.

Also described is a holster for a rechargeable battery. In some examples, the holster includes a base portion and a pivot mechanism positioned on the base portion. The pivot mechanism engages a first channel of a rechargeable battery when the rechargeable battery is in a first orientation. The holster also includes a body portion extending from the base portion. The locking mechanism engages a second channel of the rechargeable battery when the rechargeable battery rotates around the pivot mechanism as the rechargeable battery moves from the first orientation to a second orientation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
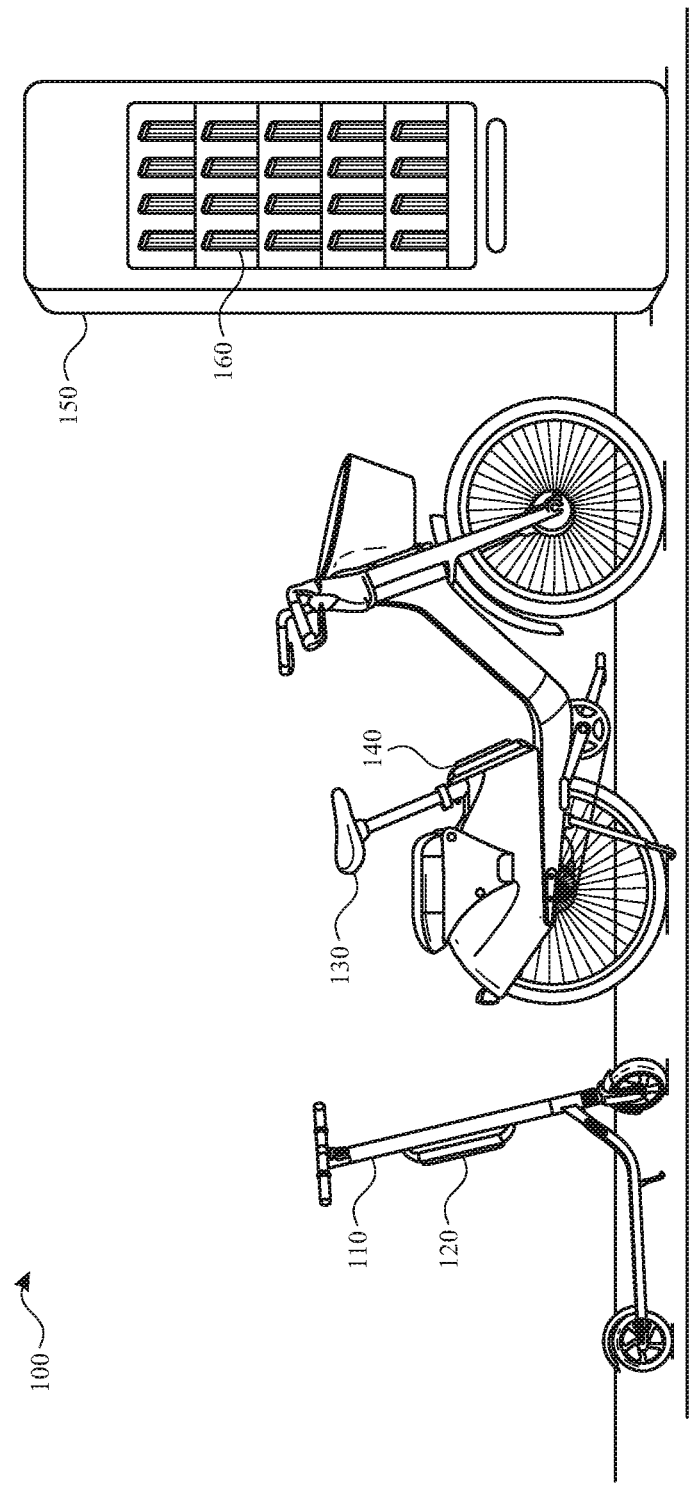
FIG. 1 illustrates an example environment in which a rechargeable battery kiosk receives and distributes rechargeable batteries for different kinds of light electric vehicles according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Light electric vehicles (e.g., scooters, bicycles, etc.) are typically powered by a rechargeable battery. In some cases, the rechargeable battery is removably coupled to the light electric vehicle. This enables an individual to exchange a rechargeable battery that has little or no remaining power with another rechargeable battery that has more power or has been fully charged.

In some examples, the light electric vehicle includes a rechargeable battery holster. The rechargeable battery holster receives or otherwise secures the rechargeable battery to the light electric vehicle. For example, the rechargeable battery holster includes a locking mechanism that engages with a recess or channel (referred to as a locking channel) defined by, formed in, or coupled to a housing of the rechargeable battery. The rechargeable battery holster also includes a pivot mechanism or structure (referred to as a pivot mechanism). The pivot mechanism engages with another recess or channel (referred to herein as a pivot channel) defined by, formed in, or coupled to the housing of the rechargeable battery. The pivot mechanism of the rechargeable battery holster and the pivot channel of the housing enable a user to properly and easily couple a rechargeable battery to, and decouple the rechargeable battery from, a light electric vehicle.

For example, when an individual couples the rechargeable battery to the rechargeable battery holster, the rechargeable battery is positioned in a first orientation (e.g., an angled orientation with respect to the rechargeable battery holster). The first orientation is an orientation in which an opening of the pivot channel of the rechargeable battery is aligned with the pivot mechanism of the rechargeable battery holster. When the pivot channel receives the pivot mechanism, the rechargeable battery may pivot around an axis of the pivot mechanism. For example, the pivot channel and pivot mechanism enables the rechargeable battery to move (e.g., rotatably moved) from the first orientation to a second orientation (e.g., an upright orientation with respect to the rechargeable battery holster).

As the rechargeable battery pivots or moves around the axis of the pivot mechanism, the pivot channel engages the pivot mechanism. For example, a shape of the pivot mechanism and a shape of the pivot channel causes an inner sidewall of the pivot channel to engage with one or more sidewalls of the pivot mechanism. Once engaged, the pivot channel and pivot mechanism inhibit or prevent removal of the rechargeable battery from the rechargeable battery holster while still enabling the rechargeable battery to move between the first orientation and the second orientation and vice versa.

When the rechargeable battery reaches the second orientation, the locking channel of the housing of the rechargeable battery receives the locking mechanism of the rechargeable battery holster. The locking mechanism, in combination with the locking channel, secure the rechargeable battery to the rechargeable battery holster.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables a user, using a client application executing on a computing device, to locate, request, and/or reserve (e.g., rent or borrow for a duration of time) one or more light electric vehicles. The information may also enable a user to locate, request, and/or reserve a rechargeable battery for the light electric vehicles. In some examples, the rechargeable battery may be used across different light electric vehicles. For example, the same rechargeable battery may be used by the electric scooter 110 and the electric bicycle 130.

In some examples, the rechargeable battery may be used by different light electric vehicles made by different companies. For example, the rechargeable battery may be made a first company, the electric scooter 110 may be made by a second company and the electric bicycle may be made by a third company. The rechargeable battery may be interchangeable between each of the light electric vehicles.

In some examples, the network service includes one or more computing systems or servers that are remote from the computing device of the user and the light electric vehicles. The one or more computing systems include an application programming interface (API) that enables the one or more computing systems to receive information from, send information to, and otherwise interact with the computing device, the light electric vehicles 110, 130 (e.g., via a controller or other interface associated with the light electric vehicles) and/or the rechargeable battery kiosk(s) 150.

For example, the client application executing on the computing device of the user receives, from the network service over the network communication channel, information about a location of one or more of the light electric vehicles. The location of each of the light electric vehicles can then be provided on a user interface of the client application.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application displays the location information of the user and the light electric vehicles as different icons (or other such representations). Once the location information is displayed, the user may select an icon representing a type of light electric vehicle (e.g., an icon for an electric scooter 110 or an icon for an electric bicycle 130). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), reserve the light electric vehicle and/or borrow the light electric vehicle for a period of time.

Each light electric vehicle and/or the network service also includes a location tracking system that tracks, receives and/or determines a location of each light electric vehicle as it is used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved or otherwise used by a user and may track location information at periodic intervals when the light electric vehicle has been reserved or is otherwise not is use.

The one or more computing systems of the network service also include one or more databases that store information about each of the light electric vehicles, the rechargeable batteries and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the user. This information may include a profile of the user (e.g., username, contact information, etc.) security credentials of the user (e.g., a password), historical usage data, payment information and the like.

The one or more computing systems of the network service may also include a matching system. The matching system receives, manages or otherwise handles various requests from the user. The requests may include light electric vehicle use requests and light electric vehicle reservation requests. For example, when a vehicle use request is received from the client application executing on the user's computing device, the matching system may communicate with the location tracking system and determine which light electric vehicle should be matched with or otherwise assigned to the requesting user.

The one or more computing systems of the network service may also include a payment system that processes payment information of the user. For example, when a user reserves and uses a light electric vehicle, the user may be charged for the usage based on a duration of use and/or a travel distance. Once the user has finished using the light electric vehicle (e.g., by arriving at their intended destination, a check-in point, a battery kiosk 150, etc.), the payment system may automatically process the payment information of the user.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a rechargeable battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a rechargeable battery holster 140.

The control system of the electric scooter 110 and/or the electric bicycle 130 manages the power output to the one or motors, provides a visual indication as to a charge level of the rechargeable battery in the rechargeable battery holster 120, and/or communicates directly (e.g., via Wi-Fi, Bluetooth, etc.) or indirectly (e.g., via one or more remote computing devices, one or more networks, the Internet, etc.) with a controller (e.g., a component associated with the light electric vehicle that includes a display, one or more buttons, etc.) associated or integrated with the light electric vehicle, the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the rechargeable battery holster 120 or the rechargeable battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a rechargeable battery holster. For example, the rechargeable battery holster 140 is affixed to the seat tube of the electric bicycle 130, while the rechargeable battery holster 120 is illustrated as being affixed to the handlebar column of the electric scooter 110. It will be appreciated that the locations of the rechargeable battery holsters 120 and 140 are provided as examples, and that a rechargeable battery holster may be positioned in a variety of alternate locations in other examples. For example, the rechargeable battery holster 140 may be affixed to the handlebar column or the cross bar of the electric bicycle 130. As another example, the rechargeable battery holster 120 may be affixed to the deck or located near the rear of the electric scooter 110.

The rechargeable battery holsters 120 and 140 are each operable to receive a rechargeable battery. For example, an individual user may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the user. In another example, the rechargeable battery and/or rechargeable battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the light electric vehicle's current battery with another rechargeable battery housed by the rechargeable battery kiosk 150, thereby enabling the light electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location. In another example, the user can initiate a battery swap at the rechargeable battery kiosk 150.

According to examples, when a battery swap is initiated, the control system of the light electric vehicle may enable the rechargeable battery 160 to be removed from a rechargeable battery holster, such as rechargeable battery holster 120 or 140. The rechargeable battery 160 may then be exchanged for a different rechargeable battery 160 housed by the rechargeable battery kiosk 150. The rechargeable battery 160 may subsequently be inserted into the rechargeable battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on a light electric vehicle and wants or needs to exchange the light electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using a light electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2:
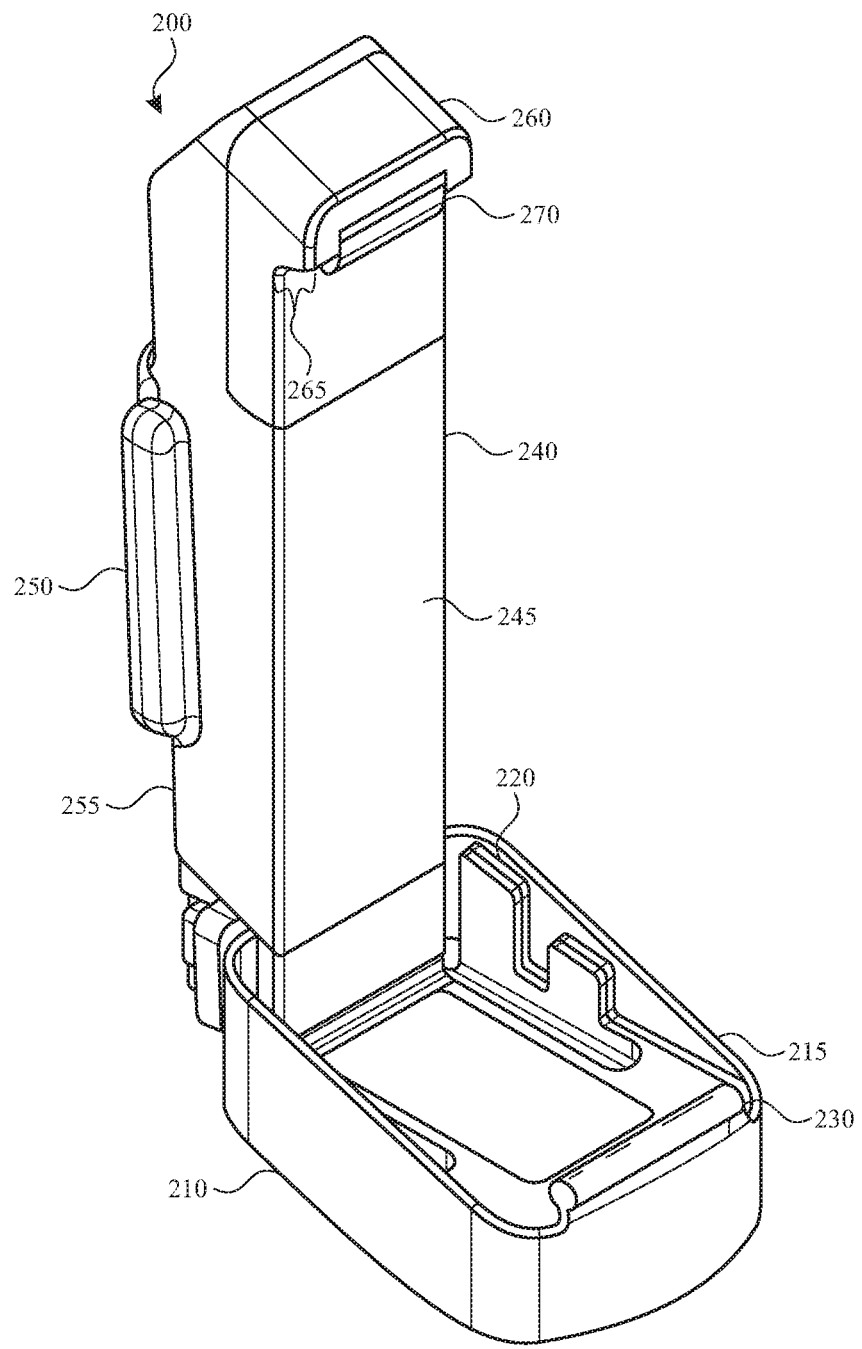
FIG. 2 illustrates a rechargeable battery holster for a rechargeable battery according to one or more examples.

FIG. 2 illustrates a rechargeable battery holster 200 for a rechargeable battery according to one or more examples. The rechargeable battery holster 200 may be similar to the rechargeable battery holster 120/140 described in FIG. 1. As such, the rechargeable battery holster 200 may be used to removably couple a rechargeable battery (e.g., rechargeable battery 160) (FIG. 1) to a light electric vehicle, such as an electric scooter 110 (FIG. 1) or an electric bicycle 130 (FIG. 1).

In some examples, the rechargeable battery holster 200 includes a base portion 210. The base portion 210 has a generally rectangular shape that corresponds to a shape of a rechargeable battery (or a shape of a base portion of a rechargeable battery). Although the base portion 210 is shown and described as having a generally rectangular shape, the base portion 210 may be configured in any shape including, but not limited to, circular, square, triangular etc.

The base portion 210 includes one or more sidewalls 215. In some examples, the one or more sidewalls 215 form an opening in the base portion 210 that receives at least a portion of the rechargeable battery when the rechargeable battery is removably coupled to the rechargeable battery holster 200. At least one sidewall 215 may include a retention feature 220. When present, the retention feature 220 may be disposed on an inner side of the sidewall 215. The retention feature 220 mates with a corresponding retention feature on a housing of the rechargeable battery.

The base portion 210 also includes a pivot mechanism 230. The pivot mechanism 230 may be formed as part of the base portion 210, as part of one of the sidewalls 215 or may be coupled to the base portion 210. In some examples, the pivot mechanism 230 extends substantially along a length of the base portion 210 and/or one of the sidewalls 215. In one example, the pivot mechanism 230 has a substantially planar top surface that transitions into a first sidewall and a second sidewall. In some examples, each of the first sidewall and the second sidewall are rounded although this is not required.

When a rechargeable battery is coupled to the rechargeable battery holster 200, the pivot mechanism 230 is received into a pivot channel defined by, provided on, or formed in a housing of the rechargeable battery. In some examples, the rechargeable battery is positioned in a first orientation (e.g., an angled orientation) with respect to the base portion 210 in order to align and couple the pivot channel with the pivot mechanism 230. When the pivot channel is coupled to the pivot mechanism 230, the rechargeable battery is moved (e.g., rotated around the pivot mechanism 230) from the first orientation to a second orientation (e.g., an upright orientation with respect to the rechargeable battery holster 200). As the rechargeable battery moves from the first orientation to the second orientation, the first sidewall and/or the second sidewall of the pivot mechanism 230 engage with the pivot channel thereby securing the rechargeable battery to the rechargeable battery holster 200. For example, the engagement of the pivot channel and the pivot mechanism may prevent or inhibit upward movement of the rechargeable battery (e.g., movement that would remove the rechargeable battery from the rechargeable battery holster) as the rechargeable battery moves from the first orientation to the second orientation.

The rechargeable battery holster 200 also includes a body portion 240. The body portion 240 vertically extends from the base portion 210. In one example, the body portion 240 is formed as part of the base portion 210. In another example, the body portion 240 is coupled to the base portion 210. The body portion 240 is generally rectangular in shape and has a substantially planar inner surface 245. Although specific shapes are mentioned, the body portion 240 may be formed in any shape. In some examples, the body portion 240 is positioned opposite the pivot mechanism 230. Accordingly, when the rechargeable battery moves from the first orientation to the second orientation when coupled to the pivot mechanism 230, the planar inner surface 245 of the body portion 240 is at least partially received and/or contained within the housing of the rechargeable battery.

A securement mechanism 250 may be positioned on an outer surface 255 of the body portion 240. In some examples, the securement mechanism 250 is positioned opposite the planar inner surface 245 of the body portion 240. The securement mechanism 250 may be used to securely couple the rechargeable battery holster 200 to a light electric vehicle (e.g., electric scooter 110 and/or electric bicycle 130) (FIG. 1). For example, the securement mechanism 250 may be used to affix the rechargeable battery holster 200 to a seat tube of a light electric vehicle, a handlebar column of a light electric vehicle, a deck of the light electric vehicle, etc. Although specific locations are given, the rechargeable battery holster 200 may be positioned in a variety of alternate locations.

The body portion 240 also includes a locking mechanism 260. The locking mechanism 260 may be positioned on a top portion of the body portion 240. In some examples, a protrusion 265 extends from the locking mechanism 260. The protrusion 265 is received into a locking channel formed within the housing of the rechargeable battery. For example, when the rechargeable battery is in the second orientation (e.g., the upright orientation shown in FIG. 4D), the protrusion may be at least partially contained within the locking channel of the rechargeable battery.

The protrusion 265 may also include a latch 270. In some examples, the latch 270 is spring loaded and retracts into the protrusion 265 when a force is applied to the latch 270 (e.g., when the latch 270 contacts a surface of the locking channel of the rechargeable battery). The latch 270 may extend from the protrusion 265 when the force is removed (e.g., when the surface of the locking channel of the rechargeable battery moves past the latch 270 as the rechargeable battery is moved into the second orientation).

For example, as the rechargeable battery moves between the first orientation and the second orientation (e.g., by pivoting or moving around the pivot mechanism 230), the latch 270 may contact a latch blade in the locking channel of the rechargeable battery. The contact causes the latch 270 to retract, thereby permitting the rechargeable battery to move to the second orientation. However, once the latch 270 moves past the latch blade (e.g., the latch blade is not applying a contact force to the latch 270), the latch 270 extends into an opening or a receptacle defined by or formed in the locking channel. In some examples, the receptacle is formed by the latch blade and locking channel. When the latch 270 is received into the receptacle, the rechargeable battery is secured or locked to the rechargeable battery holster 200. Although springs are specifically mentioned, other components may be used to cause the latch 270 to extend into the protrusion 265 and retract from the protrusion 265 as described.

Additionally, although the example provided above describes the latch 270 as retracting and extending in response to a contact force, in other examples, the latch blade may extend and retract in response to a contact force. For example, as the latch 270 comes into contact with the latch blade (e.g., as the rechargeable battery moves between the first orientation and the second orientation) contact force provided by the latch 270 (or another component in the locking mechanism 260) may cause a spring loaded latch blade to retract into the housing of the rechargeable battery thereby allowing the latch 270 to be received into the receptacle of the locking channel. When the latch 270 no longer applies the contact force to the latch blade, the springs (or other mechanism) coupled to or otherwise associated with the latch blade may cause the latch blade to extend from the housing and secure the latch in the receptacle.

Figure 3A:
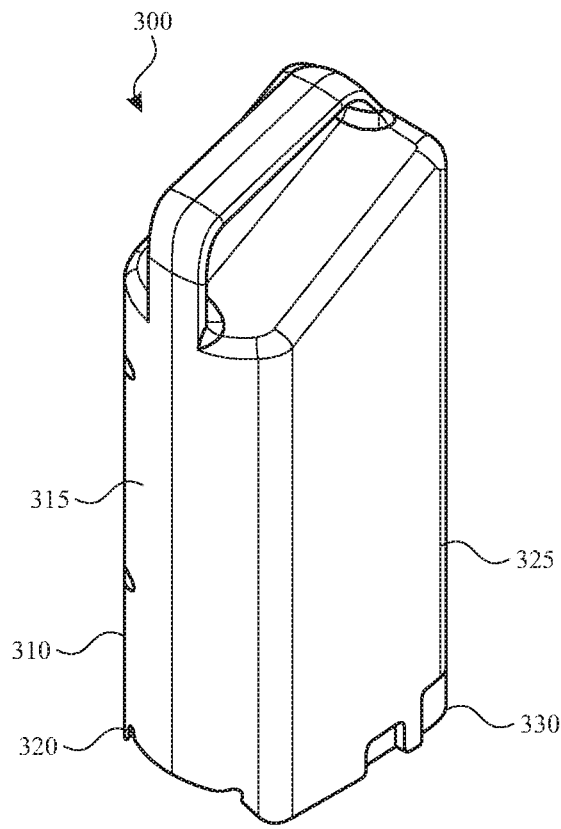
FIG. 3A illustrates a first view of a rechargeable battery that may be removably coupled to the rechargeable battery holster shown in FIG. 2 according to one or more examples.

FIG. 3A illustrates a first view of a rechargeable battery 300 that may be removably coupled to the rechargeable battery holster 200 shown in FIG. 2 according to one or more examples. The rechargeable battery 300 includes a housing 310 that surrounds and protects internal components (e.g., battery cells, charging circuitry, etc.) of the rechargeable battery 300. The housing 310 may be made of plastic, rubber, or other polymer. Although specific materials are mentioned, the housing 310 may be formed from any number of materials or combinations of materials.

Figure 3B:
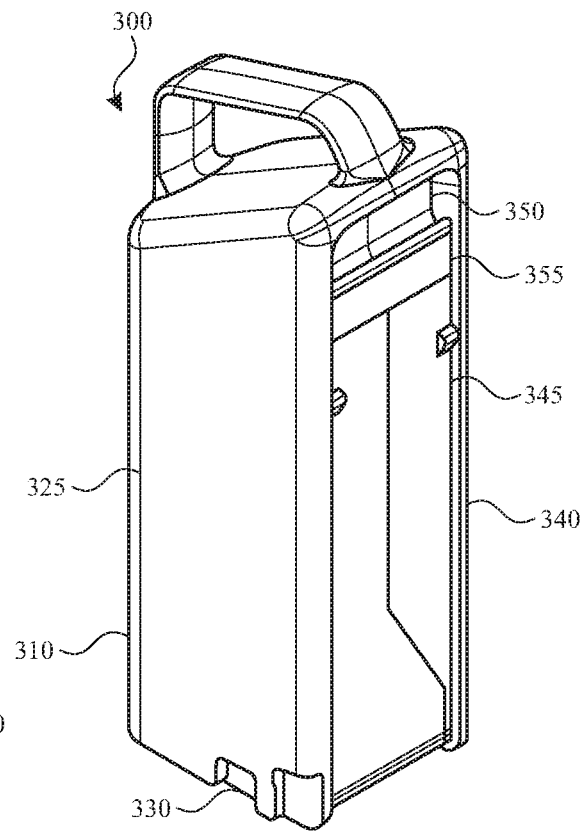
FIG. 3B illustrates a second view of the rechargeable battery of FIG. 3A according to one or more examples.

The housing 310 may be generally rectangular in shape although this is not required. For example and as shown in FIG. 3A and FIG. 3B, a first side 315 of the housing 310 may be rounded while the remaining sides of the housing 310 may be substantially planar. In another example, each side of the housing 310 may be substantially planar. In yet another example, one or more sides of the housing 310 may be rounded, triangular or have any other shape.

The first side 315 of the housing 310 includes a pivot channel 320. The pivot channel 320 may extend entirely across the first side 315 of the housing 310 or partially across the first side 315 of the housing 310. The pivot channel 320 may be defined by the housing 310. For example, the pivot channel 320 may be formed in, or as part of, the housing 310. In another example, the pivot channel 320 is a separate component that is coupled to or otherwise integrated with the housing 310. In such examples, the pivot channel 320 may be made from the same material as the housing 310 or may be made from a different material. For example, the housing 310 may be made of plastic while the pivot channel 320 component is made of metal or some other material.

Figure 3C:
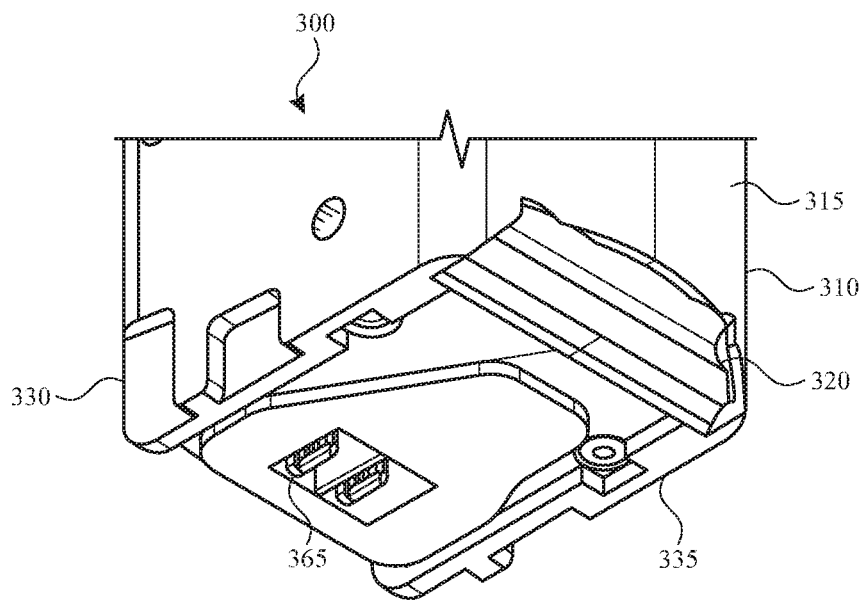
FIG. 3C illustrates a bottom view of the rechargeable battery of FIG. 3A according to one or more examples.

The pivot channel 320 may be positioned at, on, or near the bottom of the first side 315 of the housing 310 such as shown in FIG. 3A and FIG. 3C. The pivot channel 320 receives a pivot mechanism 230 (FIG. 2) of a rechargeable battery holster 200 (FIG. 2) when the rechargeable battery 300 is coupled to the rechargeable battery holster 200. The pivot channel 320, in combination with the pivot mechanism 230, enables an individual to easily couple the rechargeable battery 300 to the rechargeable battery holster 200 when the rechargeable battery 300 is in a first orientation with respect to the rechargeable battery holster 200. When the pivot channel 320 is coupled to the pivot mechanism, the individual can pivot or otherwise move the rechargeable battery around an axis of the pivot mechanism from the first orientation to a second orientation in which the rechargeable battery 300 is locked with the rechargeable battery holster 200.

In some examples, the housing 310 of the rechargeable battery 300 includes a recess feature 330. The recess feature 330 may be positioned on one or more sidewalls 325 of the housing 310. When the rechargeable battery 300 is coupled to the rechargeable battery holster 200 and is in the second orientation (e.g., an upright orientation with respect to the rechargeable battery holster 200), the recess feature 330 may mate with the retention feature 220 (FIG. 2) of the rechargeable battery holster 200. The recess feature 330 may be used to help ensure the rechargeable battery 300 is securely coupled to the base portion 210 (FIG. 2) of the rechargeable battery holster 200.

In some examples, when the recess feature 330 mates with the retention feature 220, movement of the rechargeable battery 300 within the based portion 210 and/or the rechargeable battery holster 200 may be significantly reduced and/or substantially eliminated while the light electric vehicle is in use. Reduced movement may also reduce any unwanted noise (e.g., noise caused by the housing 310 of the rechargeable battery 300 hitting the rechargeable battery holster 200 as the light electric vehicle is in use) and/or help ensure that an electrical connection between the rechargeable battery 300 and the light electric vehicle remains intact. In other examples, the recess feature 330 may be used to secure the rechargeable battery 300 in a battery kiosk such as, for example, rechargeable battery kiosk 150 (FIG. 1).

FIG. 3B illustrates a second view of the rechargeable battery 300 that may be removably coupled to the rechargeable battery holster 200 shown in FIG. 2 according to one or more examples. More specifically, FIG. 3B illustrates a second side 340 of the housing 310 of the rechargeable battery 300. In some examples, the second side 340 of the housing 310 is connected to the sidewalls 325 and positioned opposite the first side 315 of the housing 310.

The second side 340 of the housing 310 is substantially planar and may include a recessed portion 345. The recessed portion 345 may have a height and/or width substantially equivalent to a height and/or width of the second side 340 of the housing 310. The height and/or width of the recessed portion 345 may also be substantially equivalent to the height and/or width of the body portion 240 (FIG. 2) of the rechargeable battery holster 200. In some examples, at least a portion of the body portion 240 (e.g., the planar inner surface 245) of the rechargeable battery holster 200 is contained within the recessed portion 345 when the rechargeable battery 300 is coupled to the rechargeable battery holster 200 and moved or pivoted to the second orientation.

The second side 340 of the housing 310 also includes a locking channel 350. The locking channel 350 may be positioned on an upper section of the recessed portion 345. The locking channel 350 may have a depth greater than a depth of the recessed portion 345. For example, the recessed portion 345 may have a first depth when measured from an outer surface of the second side 340 of the housing 310 and the locking channel 350 may have a second depth that is greater than the first depth when measured from the outer surface of the second side 340 of the housing 310. The second depth allows the locking channel 350 to receive at least a portion of a locking mechanism 260 (FIG. 2) of the rechargeable battery holster 200 when the rechargeable battery 300 is in the second orientation. For example, when the rechargeable battery 300 is in the second orientation, the protrusion 265 (FIG. 2) of the locking mechanism 260 is received by the locking channel 350.

Figure 3D:
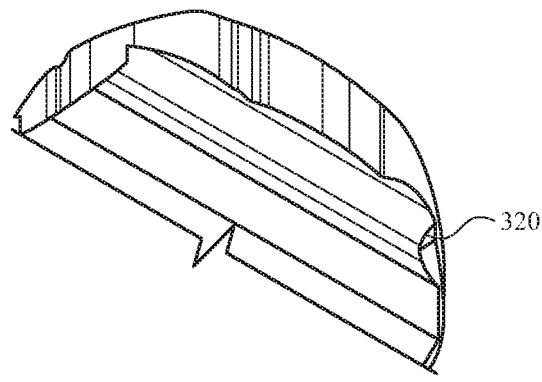
FIG. 3D illustrates an isometric view of a pivot channel that may be coupled to or integrated with a housing of the rechargeable battery of FIG. 3A according to one or more examples.
Figure 3E:
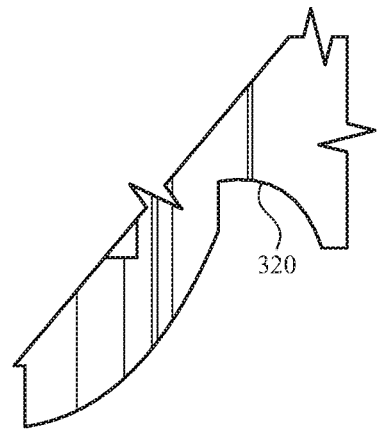
FIG. 3E illustrates a side view of the pivot channel of FIG. 3D according to one or more examples.

In some examples, the locking channel 350 also includes a latch blade 355. The latch blade 355 may be on the same plane, substantially the same plane and/or extend from the recessed portion 345. For example, the latch blade 355 may be formed as part of the recessed portion 345. In another example, the latch blade 355 is a separate component that may be coupled to the second side 340 of the housing 310 such as shown in FIG. 3G.

Figure 3F:
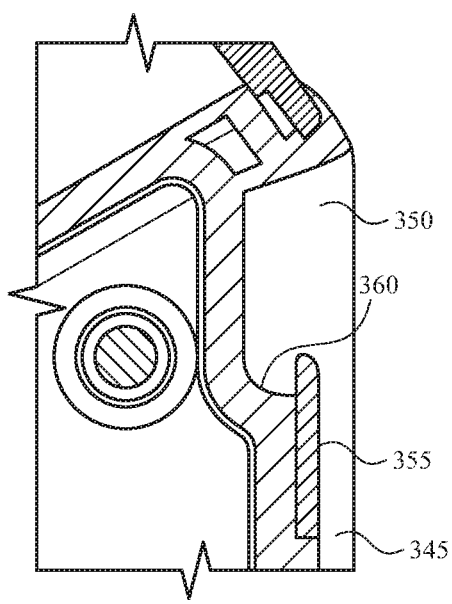
FIG. 3F illustrates a cross-section view of a locking channel formed in the housing of the rechargeable battery of FIG. 3A according to one or more examples.
Figure 3G:
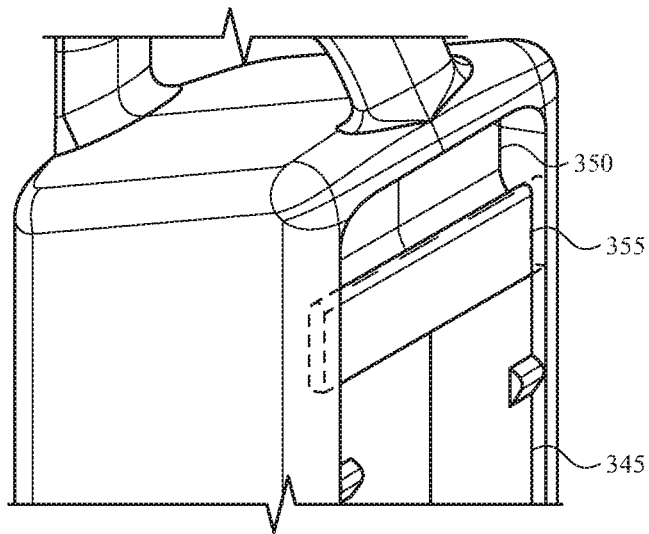
FIG. 3G illustrates an isometric view of the locking channel of FIG. 3F the rechargeable battery of FIG. 3A according to one or more examples.

The latch blade 355 extends partly into the locking channel 350 to form a receptacle 360 (FIG. 3F). When the locking mechanism 260 is received into the locking channel 350 (e.g., when the rechargeable battery 300 is moved to the second orientation), the latch 270 of the locking mechanism 260 contacts the latch blade 355. The contact causes the latch 270 to retract (e.g., into the protrusion 265 of the locking mechanism 260). When the latch 270 moves past the latch blade 355, the latch 270 extends from the protrusion 265 and is received into the receptacle 360 thereby locking or otherwise securing the rechargeable battery 300 to the rechargeable battery holster 200. Alternatively or additionally, in some examples, the latch blade 355 may retract into and/or extend from the recessed portion 345 and/or the locking channel 350 when the latch 270 contacts the latch blade 355 such as described herein.

The locking mechanism 260 may include a button, a lever, a switch or the like that when actuated, causes the latch 270 to at least partially retract into the protrusion 265. When the latch 270 has been retracted, the locking mechanism 260 may be removed from the locking channel 350. The rechargeable battery 300 may then pivot or otherwise move (due to the coupling between the pivot mechanism 230 and the pivot channel 320) from the second orientation back to the first orientation. When the rechargeable battery 300 is in the first orientation, the rechargeable battery 300 may be removed from the rechargeable battery holster 200.

At least a portion of the body portion 240 of the rechargeable battery holster 200 is received into or otherwise contained within the recessed portion 345 of the housing 310. Likewise, at least a portion of the locking mechanism 260 is received into or otherwise contained within the locking channel 350. This coupling between the rechargeable battery 300 and the rechargeable battery holster 200 may reduce and/or prevent rechargeable battery theft or attempted theft. For example, because the housing 310 of the rechargeable battery 300 at least partially surrounds or contains one or more surfaces of the rechargeable battery holster 200, it may be difficult for a thief to insert a tool or other mechanism between the rechargeable battery holster 200 and the housing 310 of the rechargeable battery 300 and gain sufficient leverage to pry the rechargeable battery 300 loose from the rechargeable battery holster 200. Likewise, since the locking mechanism 260 is at least partially contained within the locking channel 350, it may be difficult to manually trigger the latch 270 without initiating a battery exchange process (e.g., initiating a battery swap process such as described herein).

FIG. 3C illustrates a bottom surface 335 of the rechargeable battery 300 of FIG. 3A including the pivot channel 320. In some examples, the pivot channel 320 may be formed in the first side 315 of the housing 310 and partially extend or otherwise be included with the bottom surface 335 of the housing 310. For example, the bottom surface 335 of the housing 310 may include an opening that enables the pivot channel 320 to be coupled to the pivot mechanism 230 of the rechargeable battery holster 200 and rotate/pivot from the first orientation to the second orientation and vice versa.

In some examples, the bottom surface 335 of the housing 310 may also include one or more electrical connectors 365 or pins. The electrical connectors 365 may mate with corresponding electrical connectors in or associated with the rechargeable battery holster 200. When the electrical connectors 365 are coupled with electrical connectors of the rechargeable battery holster 200, the rechargeable battery 300 can provide power to a light electric vehicle. The electrical connectors 365 may also mate with charging circuitry in a battery kiosk 150 (FIG. 1) thereby enabling the rechargeable battery 300 to be charged.

FIG. 3D illustrates a first view of a pivot channel 320 that may be coupled to or integrated with the housing 310 of the rechargeable battery 300 of FIG. 3A according to one or more examples. In the example shown, the pivot channel 320 is a separate component that may be coupled to the housing 310. In such examples, the pivot channel 320 may be reinforced or made of a material (e.g., metal, steel, etc.) that is different from the housing 310. As such, the pivot channel 320 may be better able to withstand wear and tear that comes from coupling the rechargeable battery 300 to the rechargeable battery holster 200, removing the rechargeable battery 300 from the rechargeable battery holster 200 and/or moving the rechargeable battery 300 from the first orientation to the second orientation and vice versa.

FIG. 3E illustrates a second view of a pivot channel 320 according to one or more examples. In some examples, the pivot channel 320 includes an opening that extends into a rounded or substantially rounded inner wall. The rounded inner wall enables the pivot channel 320 to pivot or otherwise move around the pivot mechanism 230 as the rechargeable battery 300 moves between the first orientation and the second orientation and vice versa. Additionally, the opening of the pivot channel 320 enables the pivot mechanism 230 to be inserted into the pivot channel 320 when the rechargeable battery 300 is in a first orientation with respect to the rechargeable battery holster 200 and prevents the rechargeable battery 300 from being removed from the pivot mechanism 230 as the rechargeable battery 300 moves between the first orientation and the second orientation.

For example, when the pivot channel 320 is coupled to the pivot mechanism 230, the rechargeable battery 300 can pivot or move around an axis of the pivot mechanism 230 as the rechargeable battery 300 moves from the first orientation to the second orientation. This movement causes the rounded inner wall of the pivot channel 320 to engage one or more edges of the pivot mechanism 230 which prevents the rechargeable battery 300 from being removed from the rechargeable battery holster 200 (at least during the movement of the rechargeable battery between the first orientation to the second orientation).

FIG. 3F illustrates a cross-section view of the locking channel 350 of the rechargeable battery 300 of FIG. 3A according to one or more examples. As described herein, the locking channel 350 may be formed in the recessed portion 345 and/or otherwise defined by the housing 310 of the rechargeable battery 300. The locking channel 350 may also include a latch blade 355 that defines or otherwise forms a receptacle 360 within the locking channel 350. In some examples, the receptacle 360 receives the latch 270 of the locking mechanism 260 when the rechargeable battery 300 is in the second orientation.

FIG. 3G illustrates an isometric view of the locking channel 350 and latch blade 355 of the rechargeable battery 300 of FIG. 3A according to one or more examples. In this example, the latch blade 355 is a separate component that may be coupled to or otherwise integrated with the housing 310 of the rechargeable battery 300. For example, one or more edges of the latch blade 355 may be contained within at least a portion of the second side 340 of the housing 310. In some examples, although the latch blade 355 is a separate component, an outer surface of the latch blade 355 may be on the same plane (or substantially on the same plane) as a surface of the recessed portion 245.

The latch blade 355 may be made from any suitable material including, but not limited to, plastic or other polymer, metal, steel etc. In some examples, the latch blade 355 may be made from similar material as the pivot channel 320. In other examples, the housing 310, the latch blade 355 and/or the pivot channel 320 may be made from the same material(s) or different material(s).

Figure 4A:
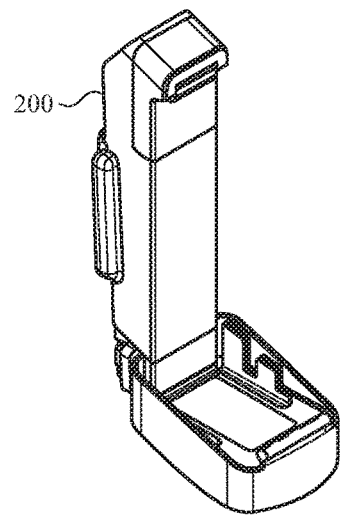
FIG. 4A illustrates a rechargeable battery and a rechargeable battery holster in a first configuration according to one or more examples.

FIG. 4A-4D illustrate how the rechargeable battery 300 of FIG. 3A is removably coupled to the rechargeable battery holster 200 of FIG. 2 according to one or more examples. More specifically, FIG. 4A shows the rechargeable battery 300 and the rechargeable battery holster 200 in a first configuration in which the rechargeable battery 300 is separate from the rechargeable battery holster 200. This configuration may be one that precedes the coupling of the rechargeable battery 300 and the rechargeable battery holster 200 or may be after the rechargeable battery 300 has been removed from the rechargeable battery holster 200 (e.g., in response to a user initiating a rechargeable battery swap at a battery kiosk 150) (FIG. 1).

Figure 4B:
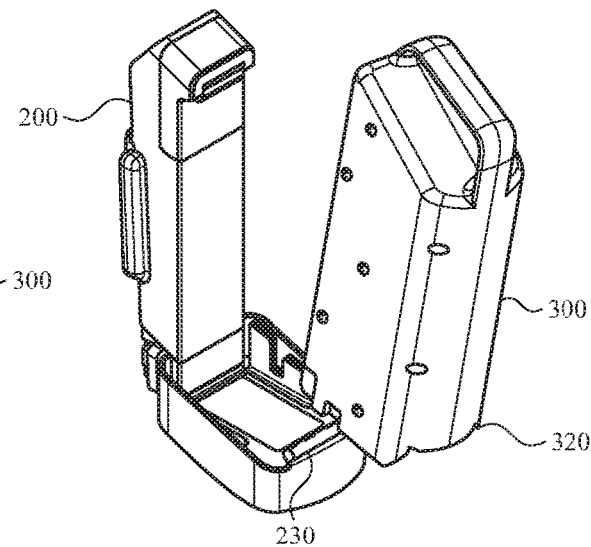
FIG. 4B illustrates the rechargeable battery in an angled orientation with respect to the rechargeable battery holster of FIG. 4A according to one or more examples.

FIG. 4B illustrates the rechargeable battery 300 in a first orientation with respect to the rechargeable battery holster 200 according to one or more examples. In the example shown, the rechargeable battery 300 is positioned in an angled orientation with respect to the rechargeable battery holster 200. For example, the rechargeable battery 300 is positioned at an angle with respect to the pivot mechanism 230 such than the opening of the pivot channel 320 of the rechargeable battery 300 is aligned with, or is otherwise positioned with, the pivot mechanism 230 of the rechargeable battery holster 200. As such, the pivot channel 320 can receive the pivot mechanism 230.

Figure 4C:
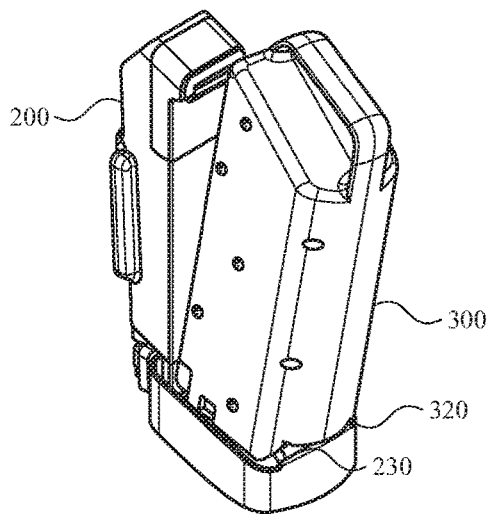
FIG. 4C illustrates the rechargeable battery coupled to the rechargeable battery holster of FIG. 4A when the rechargeable battery is in the angled orientation according to one or more examples.

When the pivot mechanism 230 and the pivot channel 320 are aligned, the rechargeable battery 300 may be moveably coupled to the rechargeable battery holster 200 such as shown in FIG. 4C. For example, when the rechargeable battery 300 is in the first orientation (e.g., the angled orientation) with respect to the rechargeable battery holster 200, the opening of the pivot channel 320 may receive the pivot mechanism 230.

Figure 4D:
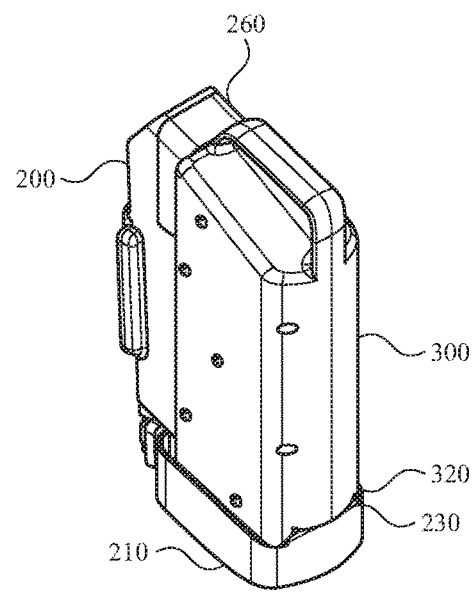
FIG. 4D illustrates the rechargeable battery and the rechargeable battery holster of FIG. 4A in an upright orientation in which the rechargeable battery is secured to the rechargeable battery holster according to one or more examples.

When the rechargeable battery 300 moves between the first orientation shown in FIG. 4C to a second orientation (e.g., an upright orientation with respect to the rechargeable battery holster 200) shown in FIG. 4D, an rounded inner wall of the pivot channel 320 engages with one or more sidewalls of the pivot mechanism 230. As a result, the rechargeable battery 300 is prevented from decoupling from the rechargeable battery holster 200. For example, the engagement between the pivot channel 320 and the pivot mechanism 230 prevents the rechargeable battery 300 from moving in an upward direction that would remove the rechargeable battery 300 from the rechargeable battery holster 200.

When the rechargeable battery 300 is moved from the first orientation shown in FIG. 4C to the second orientation shown in FIG. 4D, the locking channel 350 (FIG. 3B) receives the locking mechanism 260 of the rechargeable battery holster 200. When the locking mechanism 260 is received by the locking channel, the rechargeable battery 300 is secured/locked to the rechargeable battery holster 200.

As also shown in FIG. 4D, when the rechargeable battery 300 is in the second orientation, a bottom portion of the rechargeable battery 300 (e.g., the portion that includes the recess feature 330) (FIG. 3A) is at least partially received into the base portion 210 of the rechargeable battery holster 200. For example, the recess feature 330 may mate with a corresponding retention feature 220 (FIG. 2) within the base 210 of the rechargeable battery holster 200 such as described herein.

Figure 5A:
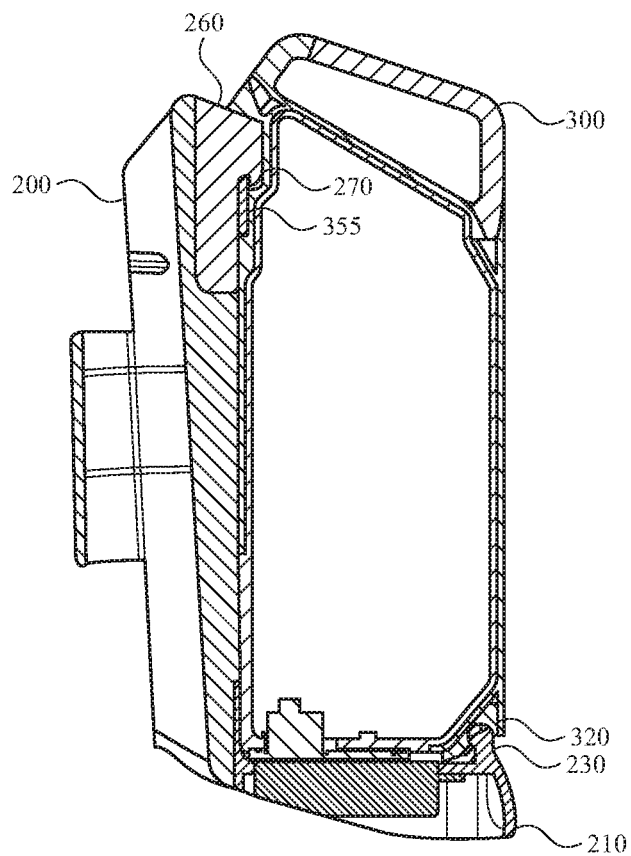
FIG. 5A illustrates a cross-section view of a rechargeable battery and a rechargeable battery holster when the rechargeable battery is coupled to the rechargeable battery holster according to one or more examples.

FIG. 5A illustrates a cross-section view of a rechargeable battery 300 coupled to a rechargeable battery holster 200 according to one or more examples. When the rechargeable battery 300 is in the second orientation (e.g., an upright orientation with respect to the rechargeable battery holster 200) the locking mechanism 260 is received, or at least partially contained, within the locking channel 350 (FIG. 3F) of the rechargeable battery 300. Additionally, the latch 270 of the locking mechanism 260 is received into the receptacle 360 (FIG. 3F) of the locking channel 350 such as described herein. The latch blade 355 and locking channel 350, in combination with the locking mechanism 260 and latch 270, lock or otherwise secure the rechargeable battery 300 to the rechargeable battery holster 200 when the rechargeable battery 300 is in the second orientation.

Figure 5B:
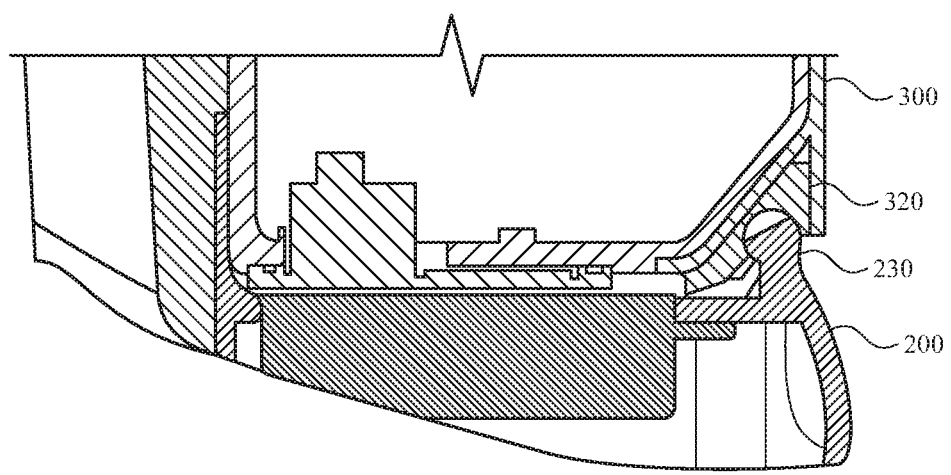
FIG. 5B illustrates a close-up cross section view of the rechargeable battery and the rechargeable battery holster of FIG. 5A according to one or more examples.

FIG. 5A also shows the engagement between the pivot mechanism 230 and the pivot channel 320 according to one or more examples. For example, when the rechargeable battery 300 is in the second orientation (and when the rechargeable battery 300 moves between the first orientation (e.g., the first orientation shown in FIG. 4C) and the second orientation (e.g., the second orientation shown in FIG. 4D)), the rounded inner wall of the pivot channel 320 engages with the one or more edges of the pivot mechanism 230. The engagement between the rounded inner wall of the pivot channel 320 and the one or more edges of the pivot mechanism 230, as well as the shape and/or positioning of the opening of the pivot channel 320, prevents the pivot channel 320 from releasing the pivot mechanism 230 while the rechargeable battery moves between the first orientation and the second orientation. The engagement between the pivot channel 320 and the pivot mechanism 230 is shown in more detail in FIG. 5B.

Figure 5C:
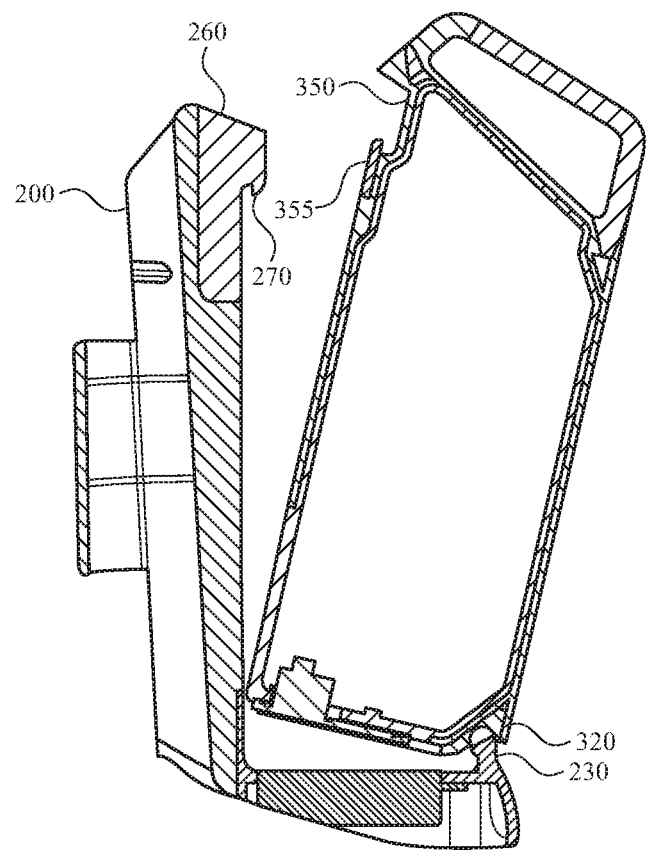
FIG. 5C illustrates a cross-section view of a rechargeable battery and a rechargeable battery holster when the rechargeable battery is moved from an upright orientation to an angled orientation which enables the rechargeable battery to be decoupled from the rechargeable battery holster according to one or more examples.

FIG. 5C illustrates a cross-section view of the rechargeable battery 300 and the rechargeable battery holster 200 when the rechargeable battery 300 is moved from the second orientation (e.g., the upright orientation shown in FIG. 5A) to the first orientation (e.g., an angled orientation) according to one or more examples. When the rechargeable battery 300 is moved from the second orientation to the first orientation, the rechargeable battery 300 can be decoupled from the rechargeable battery holster 200. In order to move the rechargeable battery 300 from the second orientation to the first orientation, the latch 270 of the locking mechanism 260 is released from the receptacle 360 (FIG. 3F) (e.g., by actuating a release mechanism on the locking mechanism 260 and/or the housing 310 of the rechargeable battery 300).

Figure 5D:
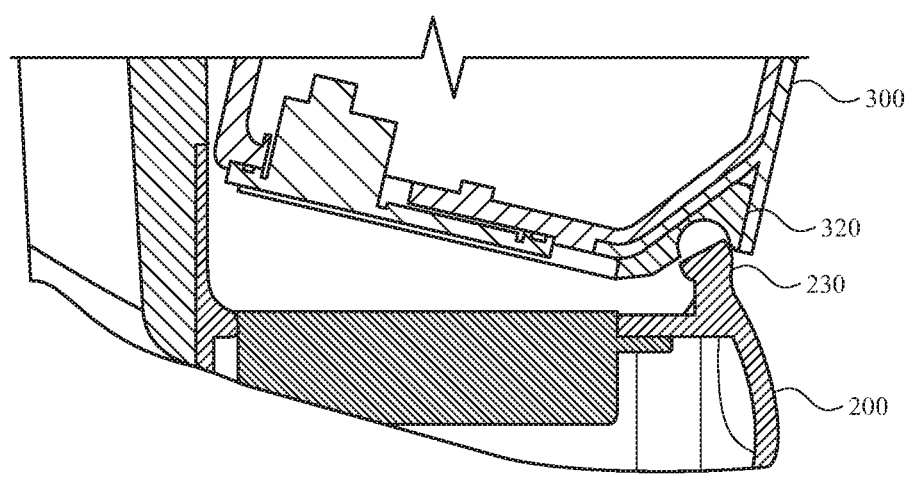
FIG. 5D illustrates a close-up cross section view of the rechargeable battery and the rechargeable battery holster of FIG. 5C according to one or more examples.

The pivot mechanism 230 and the pivot channel 320 enable the rechargeable battery 300 to pivot around an axis of the pivot mechanism 230 as it moves from the second orientation to the first orientation (or vice versa). As the rechargeable battery 300 pivots around the axis of the pivot mechanism 230, the rounded inner wall of the pivot channel 320 at least partially disengages from one or more of the sidewalls of the pivot mechanism 230. When the rounded inner wall of the pivot channel 320 disengages from the one or more sidewalls of the pivot mechanism 230, the rechargeable battery 300 may be removed from the rechargeable battery holster 200. The disengagement between the pivot channel 320 and the pivot mechanism 230 is shown in more detail in FIG. 5D.

Figure 6:
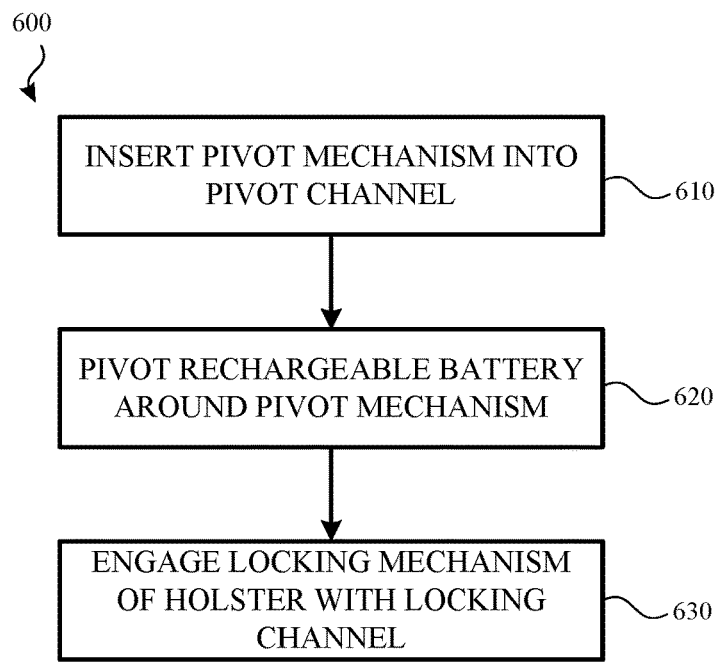
FIG. 6 illustrates a method for securing a rechargeable battery to a rechargeable battery holster according to one or more examples.

FIG. 6 illustrates a method 600 for securing a rechargeable battery to a rechargeable battery holster according to one or more examples. The method 600 may be used to secure the rechargeable battery 300 shown in FIG. 3A to the rechargeable battery holster 200 shown in FIG. 2.

Method 600 begins when a rechargeable battery is positioned in a first orientation with respect to the rechargeable battery holster. In some examples, a pivot channel of the rechargeable battery is aligned with a pivot mechanism of the rechargeable battery holster such that the pivot mechanism may be inserted into or received by (610) the pivot channel. In some examples, the pivot channel is shaped or otherwise positioned and/or formed within a housing of the rechargeable battery such that the rechargeable battery must be positioned in an angled orientation (with respect to the rechargeable battery holster) in order for the pivot mechanism to be inserted into the pivot channel.

When the pivot mechanism is received into the pivot channel, the rechargeable battery pivots (620) around the pivot mechanism as it moves from a first orientation to a second orientation. During this movement, one or more sidewalls of the pivot mechanism may engage an inner wall of the pivot channel.

As the rechargeable battery moves toward the second orientation, a locking mechanism of the rechargeable battery holster is received (630) into a locking channel of the rechargeable battery. When the locking mechanism is received into the locking channel of the rechargeable battery, the rechargeable battery is secured to the rechargeable battery holster.

Figure 7:
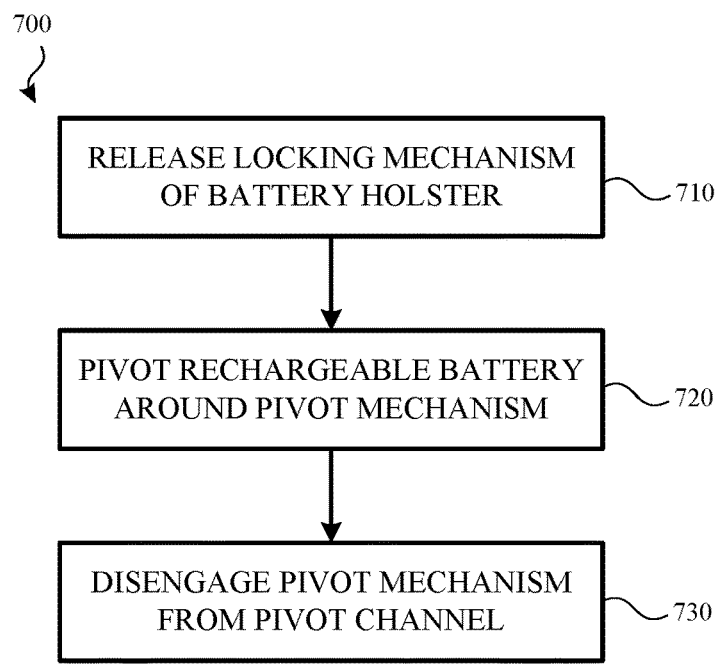
FIG. 7 illustrates a method for decoupling a rechargeable battery from a rechargeable battery holster according to one or more examples.

FIG. 7 illustrates a method 700 for decoupling a rechargeable battery from a rechargeable battery holster according to one or more examples. The method 600 may be used to remove the rechargeable battery 300 shown in FIG. 3A from the rechargeable battery holster 200 shown in FIG. 2.

Method 700 begins when a locking mechanism is released (710) from a locking channel formed or otherwise defined by a housing of the rechargeable battery. The locking mechanism may be released in response to a request received on an application executing on a computing device and/or actuation of a button, switch, latch etc. provided on the locking mechanism, a controller associated with the light electric vehicle, and/or the rechargeable battery.

When the locking mechanism is released, the rechargeable battery pivots (720) around a pivot mechanism as it moves from an upright orientation (also referred to as the second orientation) to an angled orientation (also referred to as the first orientation). For example, the rechargeable battery may include a pivot channel that is moveably coupled to the pivot mechanism. As the rechargeable battery moves from the upright orientation to the angled orientation, the pivot channel of the rechargeable battery causes the rechargeable battery to move or pivot around and axis of the pivot mechanism. As the rechargeable battery moves, one or more sidewalls of the pivot mechanism disengage with an inner wall of the pivot channel.

When the rechargeable battery reaches the angled orientation, the pivot mechanism disengages (730) the pivot channel. As a result, the rechargeable battery may be removed or otherwise separated from the rechargeable battery holster.

In light of the above, examples described herein are directed to a housing for a rechargeable battery for a light electric vehicle. The housing may include a first side defining a first channel that extends substantially along the first side of the housing and receives a pivot mechanism of a rechargeable battery holster when the rechargeable battery is positioned in a first orientation and engages the pivot mechanism when the rechargeable battery pivots around the pivot mechanism as the rechargeable battery is moved from the first orientation to a second orientation; and a second side defining a second channel that engages a locking mechanism of the rechargeable battery holster when the rechargeable battery reaches the second orientation. In some examples, the first channel is located on a bottom portion of the housing and the second channel is located on a top portion of the housing. In some examples, the first side of the housing is opposite the second side of the housing. In some examples, the second channel defines a protrusion that secures the locking mechanism of the rechargeable battery holster within the second channel. In some examples, the first orientation is an angled orientation and the second orientation is an upright orientation. In some examples, the first channel engaging with the pivot mechanism inhibits upward movement of the rechargeable battery as the rechargeable battery is moved from the first orientation to the second orientation.

Also described is a holster for a rechargeable battery. In some examples, the holster includes a base portion, a pivot mechanism positioned on the base portion that engages a first channel of a rechargeable battery when the rechargeable battery is in a first orientation and a body portion extending from the base portion. The holster also includes a locking mechanism coupled to the body portion that engages a second channel of the rechargeable battery when the rechargeable battery moves around the pivot mechanism from the first orientation to a second orientation. In some examples, the pivot mechanism is coupled to the base portion. In some examples, the pivot mechanism is formed from the base portion. In some examples, the locking mechanism is positioned on an upper section of the shaft portion. In some examples, the pivot mechanism engages the first channel as the rechargeable battery moves between the first orientation and the second orientation. In some examples, the pivot mechanism includes a planar surface that extends to a first rounded edge on a first side of the pivot mechanism and a second rounded edge on a second side of the pivot mechanism. In some examples, the holster includes a connection mechanism that secures the holster to a light electric vehicle.

The present disclosure also describes a method. The method includes releasably connecting a first portion of a housing of a rechargeable battery to a first portion of a rechargeable battery holster for a light electric vehicle when the rechargeable battery is in a first orientation, causing the rechargeable battery to move from the first orientation to a second orientation and releasably connecting a second portion of the housing of the rechargeable battery to a second portion of the rechargeable battery holster to secure the rechargeable battery to the rechargeable battery holster of the light electric vehicle. In some examples, the method also includes releasing the second portion of the housing of the rechargeable battery from the second portion of the rechargeable battery holster in response to a received input. In some examples, the input is provided on an application executing on a computing device. In some examples, the input is provided on a controller associated with the light electric vehicle. In some examples, the method also includes causing the rechargeable battery to move from the second orientation to the first orientation in response to releasing the second portion of the housing of the rechargeable battery from the second portion of the rechargeable battery holster. In some examples, releasably connecting the first portion of the housing of the rechargeable battery to the first portion of a rechargeable battery holster for the light electric vehicle comprises releasably connecting a channel defined by the housing with a pivot mechanism of the rechargeable battery holster. In some examples, the first portion of the housing of the rechargeable battery is secured to the first portion of a rechargeable battery holster when the rechargeable battery is moved from the first orientation to the second orientation.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A housing for a rechargeable battery for a light electric vehicle, comprising:
   a first side defining a first channel that extends substantially along the bottom of the first side of the housing and receives a pivot mechanism of a rechargeable battery holster when the rechargeable battery is positioned in a first orientation and engages the pivot mechanism when the rechargeable battery pivots around the pivot mechanism as the rechargeable battery is moved from the first orientation to a second orientation; and a second side defining a second channel, on an upper section of a recessed portion, that engages a locking mechanism of the rechargeable battery holster when the rechargeable battery reaches the second orientation.

2. The housing for the rechargeable battery of claim 1, wherein the first channel is located on a bottom portion of the housing and the second channel is located on a top portion of the housing.

3. The housing for the rechargeable battery of claim 1, wherein the first side of the housing is opposite the second side of the housing.

4. The housing for the rechargeable battery of claim 1, wherein the second channel defines a protrusion that secures the locking mechanism of the rechargeable battery holster within the second channel.

5. The housing for the rechargeable battery of claim 1, wherein the first orientation is an angled orientation and the second orientation is an upright orientation.

6. The housing for the rechargeable battery of claim 1, wherein the first channel engaging with the pivot mechanism inhibits upward movement of the rechargeable battery as the rechargeable battery is moved from the first orientation to the second orientation.

7. A holster for a rechargeable battery, comprising:
a base portion;
a pivot mechanism positioned on the bottom of the base portion that engages a first channel of a rechargeable battery when the rechargeable battery is in a first orientation;
a body portion extending from the base portion;
a locking mechanism, on an upper section of a recessed portion, coupled to the body portion that engages a second channel of the rechargeable battery when the rechargeable battery moves around the pivot mechanism from the first orientation to a second orientation.

8. The holster of claim 7, wherein the pivot mechanism is coupled to the base portion.

9. The holster of claim 7, wherein the pivot mechanism is formed from the base portion.

10. The holster of claim 7, wherein the locking mechanism is positioned on an upper section of a shaft portion.

11. The holster of claim 7, wherein the pivot mechanism engages the first channel as the rechargeable battery moves between the first orientation and the second orientation.

12. The holster of claim 7, wherein the pivot mechanism includes a planar surface that extends to a first rounded edge on a first side of the pivot mechanism and a second rounded edge on a second side of the pivot mechanism.

13. The holster of claim 7, further comprising a connection mechanism that secures the holster to a light electric vehicle.

14. A method, comprising:
releasably connecting a first portion of a housing of a rechargeable battery to a first portion on the bottom of a rechargeable battery holster for a light electric vehicle when the rechargeable battery is in a first orientation;
causing the rechargeable battery to move from the first orientation to a second orientation; and
releasably connecting a second portion on an upper section of the housing of the rechargeable battery to a second portion of the rechargeable battery holster to secure the rechargeable battery to the rechargeable battery holster of the light electric vehicle.

15. The method of claim 14, further comprising releasing the second portion of the housing of the rechargeable battery from the second portion of the rechargeable battery holster in response to a received input.

16. The method of claim 15, wherein the input is provided on an application executing on a computing device.

17. The method of claim 15, wherein the input is provided on a controller associated with the light electric vehicle.

18. The method of claim 15, further comprising causing the rechargeable battery to move from the second orientation to the first orientation in response to releasing the second portion of the housing of the rechargeable battery from the second portion of the rechargeable battery holster.

19. The method of claim 14, wherein releasably connecting the first portion of the housing of the rechargeable battery to the first portion of a rechargeable battery holster for the light electric vehicle comprises releasably connecting a channel defined by the housing with a pivot mechanism of the rechargeable battery holster.

20. The method of claim 14, wherein the first portion of the housing of the rechargeable battery is secured to the first portion of a rechargeable battery holster when the rechargeable battery is moved from the first orientation to the second orientation.

* * * * *